United States Patent Office 3,764,269
Patented Oct. 9, 1973

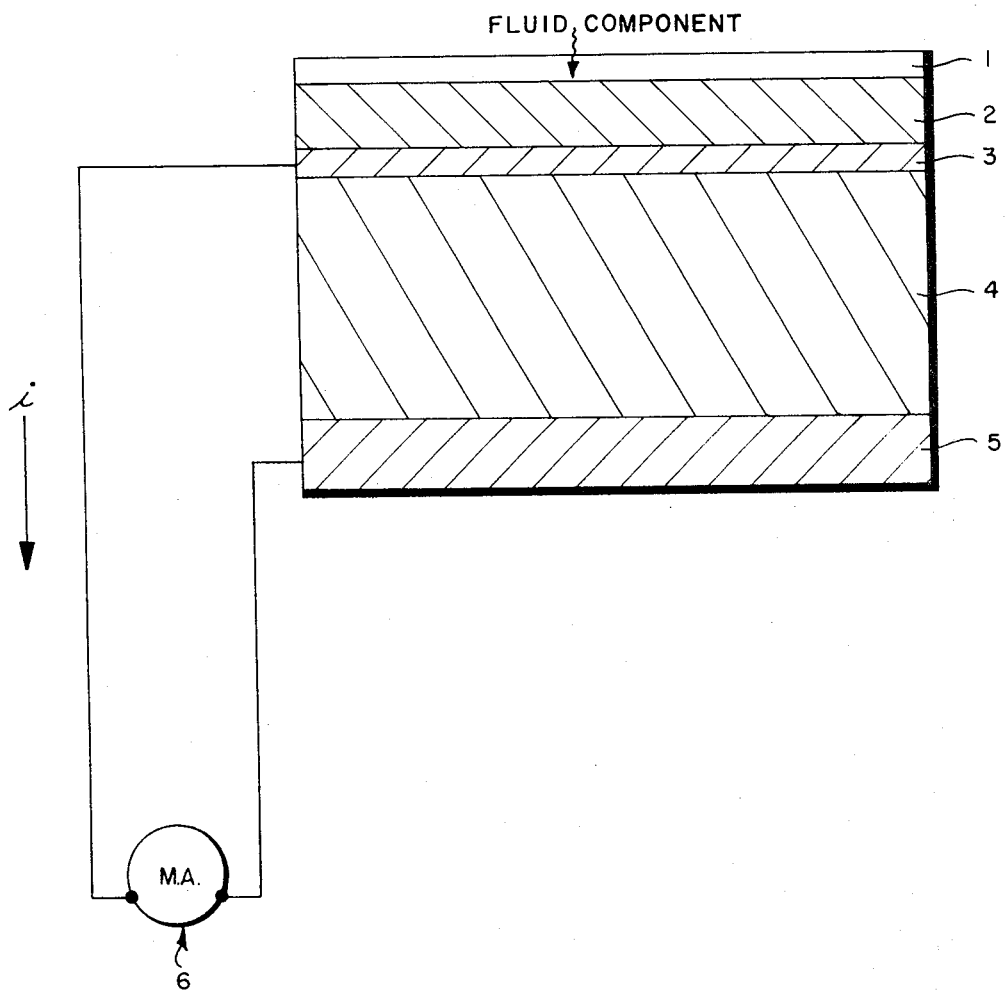

3,764,269
SENSOR FOR FLUID COMPONENTS
Keith B. Oldham, Peterborough, Ontario, Canada, and Leo E. Topol, Canoga Park, Calif., assignors to North American Rockwell Corporation
Continuation-in-part of application Ser. No. 677,501, Oct. 16, 1967. This application Dec. 28, 1971, Ser. No. 213,038
Int. Cl. B01k 1/00; G01n 27/26, 27/40
U.S. Cl. 23—254 E        10 Claims

ABSTRACT OF THE DISCLOSURE

An electrochemical device for sensing fluid components, particularly gases, is comprised of a thin membrane through which the component passes to react with a composition to liberate elemental chlorine, bromine, fluorine or iodine. The chlorine, bromine, fluorine or iodine passes through a porous layer and activates the positive electrode of a solid ionic electrolyte battery of the type: iodine/solid ionic electrolyte/metal electrode, whereby a current flow is generated through a measuring device, the current being proportional to the concentration of the fluid component.

CROSS-REFERENCE TO RELATED APPLICATION

This application is a continuation-in-part of application Ser. No. 677,501, filed Oct. 16, 1967, for "Sensor for Fluid Components," now abandoned.

BACKGROUND OF THE INVENTION

The present invention relates to an electrochemical device, for sensing fluid components and particularly gases, which utilizes a solid ionic electrolyte. Prior art fluid component sensors, e.g., oxygen sensors, typically use an electrolytic cell having two electrodes separated by a liquid electrolyte. One of the electrodes and/or the electrolyte is exposed through a permeable membrane to the oxygen to be assayed. The disadvantages of these cells are their bulk and inability to function at temperatures which would ordinarily evaporate or freeze the solution. The present invention employs a solid ionic electrolyte and, therefore, may be more compactly packaged than prior art devices. Likewise, the solid electrolyte will not evaporate at high temperatures nor is its performance impaired by cooling and, therefore, the present invention may be used over an extensive temperature range.

Another disadvantage of many prior art electrochemical sensors is that they respond logarithmically to the concentration of the substance to be detected and are, therefore, less sensitive over much of the detector range. This disadvantage is obviated in the present invention which delivers a current output linearly proportional to the partial pressure of the component to be detected in a static mass or flowing stream of a fluid. Moreover, the present invention requires no external power supply as do many prior art sensors.

SUMMARY

In accordance with the broad aspect of this invention a fluid component sensing device is provided which utilizes a composition, and particularly a chlorine-, bromine-, fluorine- or iodine-furnishing composition, e.g., a fluorogenic, chlorogenic, bromogenic or iodogenic compound, which is reactive with one or more substances or components of a fluid to liberate chlorine, bromine, fluorine or iodine. The liberated halogen is utilized to electrochemically activate an electrode of an electrochemical cell for generating a current linearly proportional to the concentration of the selected substance or substances to which the halogenic-containing substance is exposed, either directly or through the medium of some porous or semi-permeable material.

In accordance with the generally preferred aspects of the present invention a fluid component sensing device is provided utilizing inorganic iodogenic compounds, i.e., iodine-furnishing compounds, which respond to the presence of an oxidizing or reducing substance or acid gas to liberate elemental iodine for initiating a flow of current in an electrochemical cell. Thus, in the preferred aspect of the present invention an electrochemical device is provided which senses the presence and/or concentration of a substance contained in a component of a fluid by causing such a substance to react with a composition containing an inorganic iodide to liberate iodine which then flows to a porous matrix constituting the positive electrode of a solid electrolyte cell of the iodine/solid electrolyte/metal electrode type. This cell generates a detectable or measurable current output directly proportional to the partial pressure of the substance contained in or component of the fluid.

Therefore, it is an object of the present invention to provide a sensing device, for substances in a fluid medium, which is operable at high temperatures.

It is a further object of the present invention to provide a solid-state sensing device for substances in or components of a fluid medium which requires no external power supply.

It is another object of the present invention to provide a solid-state gas sensing device which produces a current output in linear proportion to the gas partial pressure or solute concentration in the static or flowing fluid under examination.

BRIEF DESCRIPTION OF THE DRAWING

These and other objects of the present invention will become more apparent from the following detailed description of the preferred embodiment of the present invention taken together with the drawing, hereby made a part thereof, which is a sectional view of the preferred embodiment.

DESCRIPTION OF THE PREFERRED EMBODIMENT

Referring now to the drawing in detail, the preferred embodiment of the present invention for detecting a gas is shown as comprising five layers. The gas to be sensed enters through a thin membrane 1, e.g., Teflon or other gas permeable membrane, which permits a feeble diffusion through to a layer of aluminum iodide 2 while protecting it from the adverse effects of the environment. Aluminum iodide is the preferred iodogenic compound from which iodine is liberated upon exposure to certain reactive gases, e.g., oxygen in the preferred embodiment. While aluminum iodide is preferred in this example a number of different types of halogen liberating compositions may be utilized for different applications in the combination of the present invention.

With respect to iodine liberating compositions, the first type is an iodine-containing composition which yields elemental iodine by replacement upon exposure to a reactive fluid substance. Thus, certain iodides, such as aluminum iodide, yield iodine in response to a variety of oxidizing agents including atmospheric oxygen in accordance with reactions such as:

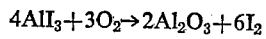

Others, such as potassium iodide, require more energetic oxidizing agents in order to yield iodine at a rate sufficient to activate the electrochemical cell, e.g.,

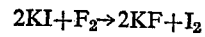

Still others require special conditions to liberate iodine in the presence of an oxidizing agent. For example, iodoform, $CHI_3$ reacts with air to produce iodine at a rate sufficient to activate the electrochemical cell only in the presence of sunlight. A device utilizing iodoform could also be utilized as a light sensing element or a combined air-light sensor.

The second type of iodine liberating compounds are compounds in which iodine fills an electropositive role, such as iodine pentoxide. This compound reacts with a reducing agent to produce the requisite elemental iodine in accordance with reactions of which the following is an example:

$$I_2O_5 + 5CO \rightarrow I_2 + 5CO_2$$

The third type of iodogenic compositions are those compositions which comprise a salt plus an oxidizing agent. Iodides react with many proton donors, e.g., hydrogen chloride, to produce hydrogen iodide by a replacement reaction:

$$I^- + HCl \rightleftharpoons Cl^- + HI$$

A variety of oxidizing agents will convert the hydrogen iodide to iodine, displacing the above equilibrium and leading to a stoichiometric conversion to iodine. Potassium iodide plus manganese dioxide, for example, reacts with hydrogen chloride in the following manner:

$$KI + HCl \rightarrow KCl + HI$$
$$4HI + MnO_2 \rightarrow MnI_2 + 2H_2O + I_2$$

The oxidizing agent could also contribute additional iodine if, for example, potassium iodate was used.

The fourth type of iodogenic compositions are those compositions which comprise a salt plus oxidizing agent plus potential proton donor. Thus, compositions of the third type, including a potential proton source within the iodogenic mixture, are contemplated. Water is not a sufficiently good proton donor to liberate iodine from an iodide-iodate mixture. However, in the presence of substances which dissolve in or react with water or other solvent to yield acidic solutions, proton donation becomes possible. An example of this class are the double salts $2NaIO_3 \cdot 3NaI \cdot 15H_2O$ and $2NaIO_3 \cdot 3NaI \cdot 20H_2O$. These compositions in the presence of nitrogen dioxide decompose in the following manner:

$$2NO_2 + 3H_2O \rightarrow NO_3^- + NO_2^- + 2H_3O^+$$
$$H_3O^+ + I^- \rightarrow HI + H_2O$$
$$6HI + IO_3^- \rightarrow I^- + 3H_2O + 3I_2$$

In addition to the above salts, mixtures of the individual hydrates $NaIO_3 \cdot H_2O$ and $NaI \cdot 2H_2O$ also react similarly. Further, mixtures of $NaIO_3$, $NaI$ and $H_2O$ which are dried carefully also behave as above. As long as no excess moisture is present, these solid salts do not react with $CO_2$, $CO$ or hydrocarbons.

Table I exemplifies the various embodiments of the present invention as applied to iodogenic compounds and identifies the reactive fluid substance which is detected.

TABLE I

| Iodogenic compound | Reactive component | Not reactive to- |
|---|---|---|
| $AlI_3$ | $O_2$, $Cl_2$ and other oxidizing gases. | Non-oxidizing gases. |
| $BI_3$ | | |
| $BeI_2$ | | |
| $KI$ | $F_2$, $Cl_2$, $O_3$ | $O_2$. |
| $I_2O_5$ | $CO$, $NO$, $C_2H_2$, $NH_3$ | $SO_2$, $N_2O_4$. |
| $KI+MnO_2$ | HCl and other protonic acid gases.* | Dry $SO_2$, $N_2O_4$, $CO_2$. |
| $2NaIO_3 \cdot 3NaI \cdot 15H_2O$ | All acid gases: * HCl, $SO_2$, $N_2O_4$, $NO_2$, $NO$, $Cl_2$. | |
| $2NaIO_3 \cdot 3NaI \cdot 20H_2O$ | | |
| $CHI_3$ | Air in sunlight | Air in the dark. |

*Acid gases are those which dissolve in or react with water or other solvent to yield acidic solutions.

Several iodogenic agents have been discovered by L. E. Topol, a co-inventor herein, which are specific to certain fluid components. Solid sodium iodate monohydrate ($NaIO_3 \cdot H_2O$) reacts readily at room temperature with sulfur dioxide releasing iodine. This salt will not yield iodine by reaction with other gases such as oxygen and chlorine. Other hydrated iodates as well as double salts such as $Pb(IO_3)_4 \cdot 2HIO_3 \cdot 2H_2O$ will also work. The reactions involved with sodium iodate monohydrate are believed to be:

$$NaIO_3 \cdot H_2O + SO_2 \rightarrow NaIO_3 + H_2SO_3$$
$$NaIO_3 + 3H_2SO_3 \rightarrow NaI + 3H_2SO_4$$
$$NaIO_3 + 5NaI + 6HSO_4^- \rightarrow 3I_2 + 3H_2O + 6SO_4^= + 6Na^+$$

For detecting ozone and not other gases such as sulfur dioxide and hydrogen chloride, solid mercuric iodide ($HgI_2$) can be used to yield iodine in a room temperature reaction. For detecting nitrogen dioxide, solid lead iodide ($PbI_2$) can be used. Lead iodide will not react at room temperature with other gases such as oxygen and sulfur dioxide. Solid copper iodide (CuI) has been found to be a specific detectant for nitrogen oxides and will react readily with $NO_2$ and $NO$ at room temperature to yield iodine.

With respect to chlorine and bromine, there are many chlorogenic and bromogenic compounds which act in an analogous manner to the above iodogenic compounds in sensing fluid components. For example, bromides, such as aluminum bromide ($AlBr_3$), boron bromide ($BBr_3$) and beryllium bromide ($BeBr_2$), will yield elemental bromine in response to a variety of oxidizing agents such as atmospheric oxygen and chlorine. Other bromides and some chlorides require more energetic oxidizing agents in order to yield elemental bromine or chlorine at a rate sufficient to activate the electrochemical cell. For example, potassium bromide (KBr) yields elemental bromine by reaction with chlorine or fluorine and potassium chloride (KCl) yields elemental chlorine by reaction with fluorine. An illustration of the compositions which comprise a salt and an oxidizing agent is potassium bromide plus manganese dioxide which reacts with hydrogen chloride to yield elemental bromine. With respect to compositions which comprise a salt plus oxidizing agent plus potential proton donor, bromide (e.g., NaBr)- bromate (e.g., $NaBrO_3$) water mixtures and chloride (e.g., NaCl)- chlorate (e.g., $NaClO_3$) water mixtures can be used as well as the above described iodide-iodate mixtures for reaction with acid gases in the presence of a proton donor. With respect to chlorine, L. E. Topol has independently found that solid oxides such as lead oxide ($PbO_2$) and manganese oxide ($MnO_2$) and other solid oxidizing agents such as potassium chlorate ($KClO_3$) react readily with hydrogen chloride at room temperature to yield chlorine which can be detected by a solid state electrochemical cell as disclosed herein. These oxides are specific to hydrogen chloride and will not react with other gases such as oxygen or nitrogen dioxide. Rather than detecting the released chlorine directly, it can be reacted with another salt such as mercuric bromide or iodide ($HgI_2$) to yield bromine or iodine which is then detected by the electrochemical cell.

A fluid component such as ozone can react with various fluorine-containing compounds to yield detectable elemental fluorine. Such compounds would include fluorides of lanthanum III, aluminum III, cerium III, chromium III, gadolinium III, Nd III, Pr III, Sm III, Sc III, Tb III, Ti III, vanadium V and Y III. Aluminum and yttrium are preferred based on thermodynamic data.

It is also within the purview of the present invention to utilize mixtures of the various chlorogenic, fluorogenic, bromogenic or iodogenic compounds which do not interact where one or more reactive fluids are to be detected. In this manner many of the reactive fluids may be quantitatively measured by utilizing several detector combinations at least one of which would contain a plurality of halogenic compounds. Other similar modifications contemplated are the use of inert materials with the halogenic compounds and the dilution of said compounds with other active materials, such as drying agents, to enchance the desired reactive process. The term halogenic includes not only chlorogenic, bromogenic, fluorogenic and iodogenic compounds but the so-called halogenoids, for example potassium cyanide (KCN) and potassium thiocyanate (KSCN).

Referring again to the drawing, layer 2 has an open structure in the form of a loose powder or other porous physical structure which allows the liberated gaseous halogen to pass through to the next layer 3. The rate at which the halogen reaches the third layer is measured by any means reactive to free halogen such as an electrochemical cell. Particularly preferred because of its temperature and operational characteristics is the solid state electrochemical cell of the iodine/solid electrolyte/metal electrode type.

In the particular embodiment the layer 3 is preferably a thin inert porous electronic conductor such as porous graphite. The halogen passes through porous conductive layer 3 to a solid electrolyte 4 of a solid state electrochemical cell. The electrolyte of the preferred embodiment is $RbAg_4I_5$, however, a number of other compounds, including silver chloride, silver bromide and silver iodide, may be used. A wide variety of systems using solid ionic electrolytes are disclosed in the copending applications of Argue et al., Ser. No. 569,193, entitled "Solid Ionic Conductors," filed Aug. 1, 1966, now abandoned, and Boone B. Owens, Ser. No. 651,499, entitled "Solid Electrolytes," filed July 6, 1967, now U.S. Patent No. 3,476,606, the disclosures of which are incorporated herein by reference.

The opposite side of the layer of solid electrolyte 4 has a contacting interface with a metal electrode 5. For the solid ionic electrolytes the preferred electrode is powdered silver comprised of a mixture of graphite, ionic electrolyte, and powdered silver, although any electrode consisting of metallic silver or having metallic silver as a component could be used. The powdered silver electrode 5 was used instead of a pure silver electrode because it provides better electrical contact with ionic electrolyte 4, however, solid silver could be used for electrode 5 with a slight decrease in sensitivity. The silver-containing electrode 5 is electrically connected to the graphite layer 3 through a current measuring device 6 which registers the electron exchange taking place in the following chemical reactions:

At the interface of the thin porous electrode 3 and the electrolyte 4: $Cl_2$, $Br_2$ or $I_2 + 2e^- \rightarrow 2Cl^-$, $2Br^-$ or $2I^-$; and at the interface of the electrolyte 4 and the silver containing electrode 5: $2Ag \rightarrow 2Ag^+ + 2e^-$.

Thus, the silver electrode 5 provides silver ions and electrons and the latter flow through current measuring device 6 to layer 3 to reduce the chlorine, bromine or iodine or other halogen used.

This circuit, including measuring device 6, measures the current representing the rate of production free chlorine, bromine or iodine from the chlorine-, bromine- or iodine-furnishing layer 2. The current flow is directly proportional to the amount of the reactive component of the fluid substance which passes through the permeable membrane 1. In the example of the preferred embodiment the reactive component is oxygen and this current is a direct function of the oxygen partial pressure in the gas adjacent the permeable membrane 1.

In the preferred embodiment the membrane 1 is a Teflon layer .003 cm. thick in contact with one surface of an $AlI_3$ reactive iodide layer 2 having a .7 cm. thickness. The porous electrode 3 is graphite with a thickness of about one mm. having one surface contacting the reactive iodide layer 2 and the other surface operatively associated with one face of a solid ionic electrolytic layer 4. The layer 4 comprises a ½ cm. thick layer of $RbAg_4I_5$ and has one surface operatively contacting the powdered silver electrode 5. This electrode is about 0.3 cm. in thickness. The current measuring circuit is connected between the two electrodes 3 and 5 and the measuring device 6 is preferably a microammeter.

All the layers in the preferred embodiment are circular in cross section and have a radius of 0.60 cm. In order to insure proper control of the exposure to the environment the entire device is encased in a Lucite tube which has a crew cap on the membrane end. When the device is not in use the cap could be fastened tightly to keep out oxygen or other reactive fluid components and thus prolong the life of the sensor. When use is desired the cap adjacent the Teflon layer is removed and the device exposed through the Teflon to a fluid having a component to be detected. The preferred embodiment has a life of the order of one month assuming continuous exposure to the oxygen in the air. Its response time is about one minute. The response time is primarily a function of the thickness of membrane 1, the response being faster for a thinner membrane. Longevity is primarily a function of the thicknesses of layers 1 and 2 because 1 controls the rate of utilization and because when 2 is completely reacted the device will cease to function. The life is longer for a thicker layer. The thickness of the membrane 1 and the reactive layer 2 are somewhat interdependent. The thickness of reactive layer 2 may control the rate at which liberated gaseous chlorine, bromine or iodine diffuses through to graphite layer 3. Thus, it must be made just thin enough to permit the iodine, or the chlorine or bromine, to diffuse through at the rate at which it is produced; the rate of production of the chlorine, bromine or iodine being a function of membrane 1 thickness. Making the layer 2 any thinner than this would only shorten the life of the device without improving the response time. The ratio of membrane 1 thickness to reactive layer 2 thickness is preferably about 1 to 1000 and may be calculated on the basis of the above criteria and a given response time or life time. The membrane 1 is preferably an inert material as in the above described embodiment. It is desirable when one is using the device for detection of species in liquid solutions but need not be employed in sensing species in the gas phase. However, the material or its form may also function as a filter element when desirable.

The present invention is not limited to the specific details of the particular embodiment described, since many modifications will be apparent to those skilled in the art, the scope of the present invention being limited only by the appended claims.

We claim:

1. A device for sensing at least one component of a fluid substance comprising:
   (a) first means including a composition reactive with at least one component of said fluid to liberate elemental chlorine, bromine, fluorine or iodine upon exposure to said component;
   (b) a porous matrix electrode in cooperative relation to said first means forming a first electrode through which said liberated chlorine, bromine, fluorine or iodine passes; and
   (c) a solid electrolyte cell with current measuring means across its electrodes including said porous matrix electrode, said measuring means operatively associated with said matrix and responsive to said liberated chlorine, bromine, fluorine or iodine for measuring the rate of production of said chlorine, bromine, fluorine or iodine, said rate of production being proportional to the concentration of said component in said fluid.

2. The device of claim 1 wherein said composition is a chlorine-, bromine-, fluorine- or iodine-containing composition.

3. The device of claim 1 wherein said composition is an iodine-containing composition which is reactive in response to said at least one component of said fluid to liberate elemental iodine from said composition upon exposure to said component.

4. The device of claim 3 wherein said iodine-containing composition is an inorganic composition.

5. A device for sensing at least one component of a fluid substance comprising:

first means including at least one halogenic compound reactive in response to at least one component of said fluid to liberate an elemental halogen from said compound;

an electrochemical cell including a porous matrix electrode operatively associated with said first means and adapted to react with said liberated halogen, said cell including a solid ionic electrolyte body having one surface in contact with said porous electrode and another surface in contact with a silver-containing electrode; and electrical means connected across said cell for measuring current flow in said cell, said current flow being initiated by reaction at the interface of said porous electrode and the electrolyte of the liberated halogen and being linearly proportional to the concentration of the detected component in said fluid.

6. The device of claim 5 wherein said at least one component is an oxidizing gas and said halogenic compound is reactive with said gas to liberate elemental chlorine, bromine, fluorine or iodine.

7. The device of claim 5 wherein said at least one component is a reducing gas and said halogenic compound is a chlorogenic, bromogenic or iodogenic compound reactive with said gas to liberate elemental chlorine, bromine or iodine.

8. The device of claim 5 wherein said at least one component is an acid gas and said halogenic compound is a chlorogenic, bromogenic or iodogenic compound reactive with said gas to liberate elemental chlorine, bromine or iodine.

9. The device of claim 5 wherein said at least one component is an oxidizing gas and wherein said halogenic compound is an iodogenic compound which is $AlI_3$, $BI_3$, or $BeI_2$.

10. The device of claim 9 wherein said iodogenic compound is $AlI_3$.

References Cited
UNITED STATES PATENTS

| | | | |
|---|---|---|---|
| 3,514,377 | 5/1970 | Spacil | 204—195 S |
| 3,597,345 | 8/1971 | Hickam | 204—195 S |
| 3,607,701 | 9/1971 | Wheeler | 204—195 S |
| 3,616,408 | 10/1971 | Hickam | 204—195 S |
| 3,691,023 | 9/1972 | Ruka | 204—195 S X |
| 3,258,415 | 6/1966 | Kordesch | 136—86 R |
| 3,342,558 | 9/1967 | Reinecke | 23—232 E |
| 3,519,404 | 7/1970 | Argue | 136—153 X |
| 3,540,851 | 11/1970 | Vree | 23—232 E |
| 3,598,654 | 8/1971 | Hruden | 136—153 X |
| 3,647,641 | 3/1972 | Grubb | 136—86 R |
| 3,660,164 | 5/1972 | Hermann | 136—86 R |
| 3,661,647 | 5/1972 | Owens | 136—83 R |
| 3,663,299 | 5/1972 | Owens | 136—83 R |
| 3,698,955 | 10/1972 | Lilly | 136—83 R |
| 3,714,562 | 1/1973 | McNerney | 23—254 EX |

MORRIS O. WOLK, Primary Examiner

S. MARANTZ, Assistant Examiner

U.S. Cl. X.R.

23—230 R, 232 E; 73—23; 136—83 R, 86 R, 153; 204—195 S